United States Patent
Ruvang

(10) Patent No.: US 8,429,838 B2
(45) Date of Patent: Apr. 30, 2013

(54) RETROFITTED EXCAVATOR TOOTH ATTACHMENT

(75) Inventor: John A. Ruvang, Bartonville, TX (US)

(73) Assignee: Black Cat Blades Ltd., Edmonton, Alberta (CA)

( * ) Notice: Subject to any disclaimer, the term of this patent is extended or adjusted under 35 U.S.C. 154(b) by 0 days.

(21) Appl. No.: 13/572,275

(22) Filed: Aug. 10, 2012

(65) Prior Publication Data

US 2012/0304505 A1 Dec. 6, 2012

Related U.S. Application Data

(60) Division of application No. 13/269,780, filed on Oct. 10, 2011, now Pat. No. 8,261,472, which is a continuation-in-part of application No. 12/608,803, filed on Oct. 29, 2009, now Pat. No. 7,980,011, which is a continuation-in-part of application No. 12/408,880, filed on Mar. 23, 2009, now abandoned.

(30) Foreign Application Priority Data

Oct. 28, 2010 (WO) ................ PCT/US2010/054499

(51) Int. Cl.
*E02F 9/28* (2006.01)
(52) U.S. Cl.
USPC .......................................................... 37/452
(58) Field of Classification Search ............ 37/452–460, 37/446, 449; 172/701.1–701.3; 403/150, 403/153, 355, 297; 209/109–113
See application file for complete search history.

(56) References Cited

U.S. PATENT DOCUMENTS

| | | | |
|---|---|---|---|
| 1,548,374 | A | 8/1925 | Mullally |
| 3,762,079 | A | 10/1973 | Lukavich et al. |
| 4,213,257 | A | 7/1980 | Johansson et al. |
| 4,326,348 | A | 4/1982 | Emrich |
| 4,481,728 | A | 11/1984 | Mulder et al. |
| 5,088,214 | A | 2/1992 | Jones |
| 5,718,070 | A | 2/1998 | Ruvang |
| 5,765,301 | A | 6/1998 | Clendenning |
| 5,909,962 | A | 6/1999 | Livesay et al. |

(Continued)

FOREIGN PATENT DOCUMENTS

| | | |
|---|---|---|
| WO | 9316239 A1 | 8/1993 |
| WO | 2005095720 A1 | 10/2005 |

OTHER PUBLICATIONS

Search Report issued Jul. 19, 2011 for International Application Serial No. PCT/US2010/054499, 5 pages.

(Continued)

*Primary Examiner* — Robert Pezzuto
(74) *Attorney, Agent, or Firm* — Smith IP Services, P.C.

(57) ABSTRACT

An excavator implement attachment system can include a tooth having a pocket formed therein, an insert received in a recess formed in an adaptor nose and a threaded fastener which releasably secures the tooth on the nose, the fastener having a helical thread formed thereon which is eccentric relative to a fastener body. A tooth can include a pocket with at least one side wall which has an insert-receiving recess and generally planar insert-engaging interface surfaces formed therein, with one interface surface resisting rotation of the tooth about a longitudinal axis in one direction, and another interface surface resisting rotation of the tooth about the longitudinal axis in an opposite direction. An excavator tooth can include a pocket bounded by opposing side walls, with at least one of the side walls having an insert-receiving recess internally formed thereon, whereby the recess receives an insert installed in an adaptor nose.

8 Claims, 15 Drawing Sheets

U.S. PATENT DOCUMENTS

| | | | |
|---|---|---|---|
| 5,937,550 | A | 8/1999 | Emrich |
| 6,108,950 | A | 8/2000 | Ruvang et al. |
| 6,194,080 | B1 | 2/2001 | Stickling |
| 6,393,739 | B1 | 5/2002 | Shamblin et al. |
| 6,430,851 | B1 | 8/2002 | Clendenning |
| 6,439,796 | B1 | 8/2002 | Ruvang et al. |
| 7,178,274 | B2 | 2/2007 | Emrich |
| 7,526,886 | B2 | 5/2009 | McClanahan et al. |
| 7,707,755 | B2 | 5/2010 | Lopez Almendros et al. |
| 7,980,011 | B2 | 7/2011 | Ruvang |
| 2003/0037467 | A1 | 2/2003 | Bierwith |
| 2003/0101627 | A1 | 6/2003 | Robinson et al. |
| 2003/0167663 | A1 | 9/2003 | Champney |
| 2005/0095720 | A1 | 5/2005 | Lorber et al. |
| 2007/0107274 | A1 | 5/2007 | Livesay et al. |
| 2010/0236108 | A1 | 9/2010 | Ruvang |
| 2011/0030247 | A1 | 2/2011 | Ruvang |
| 2012/0102790 | A1 | 5/2012 | Ruvang |

OTHER PUBLICATIONS

Written Opinion issued Jul. 19, 2011 for International Application Serial No. PCT/US2010/054499, 4 pages.

International Search Report with Written Opinion issued Jul. 19, 2011 for International Patent Application No. PCT/US10/054499, 9 pages.

Office Action issued Dec. 17, 2010, for U.S. Appl. No. 12/608,803, 12 pages.

International Search Report with Written Opinion issued Aug. 10, 2010, for International Application No. PCT/US10/026365, 10 pages.

Specification and Drawings for U.S. Appl. No. 13/557,323, filed Jul. 25, 2012, 27 pages.

Specification and Drawings for U.S. Appl. No. 12/408,880, filed Mar. 23, 2009, 44 pages.

International Search Report with Written Opinion issued Oct. 8, 2010, for International Application No. PCT/US10/026365, 10 pages.

International Preliminary Report on Patentability issued Oct. 6, 2011, for International Application No. PCT/US10/026365, 7 pages.

International Search Report with Written Opinion issued Mar. 23, 2012 for PCT Patent Application No. PCT/US11/049440, 10 pages.

Office Action issued Feb. 23, 2012 for U.S. Appl. No. 12/903,256, 15 pages.

Office Action issued Jun. 27, 2012 for U.S. Appl. No. 12/903,256, 10 pages.

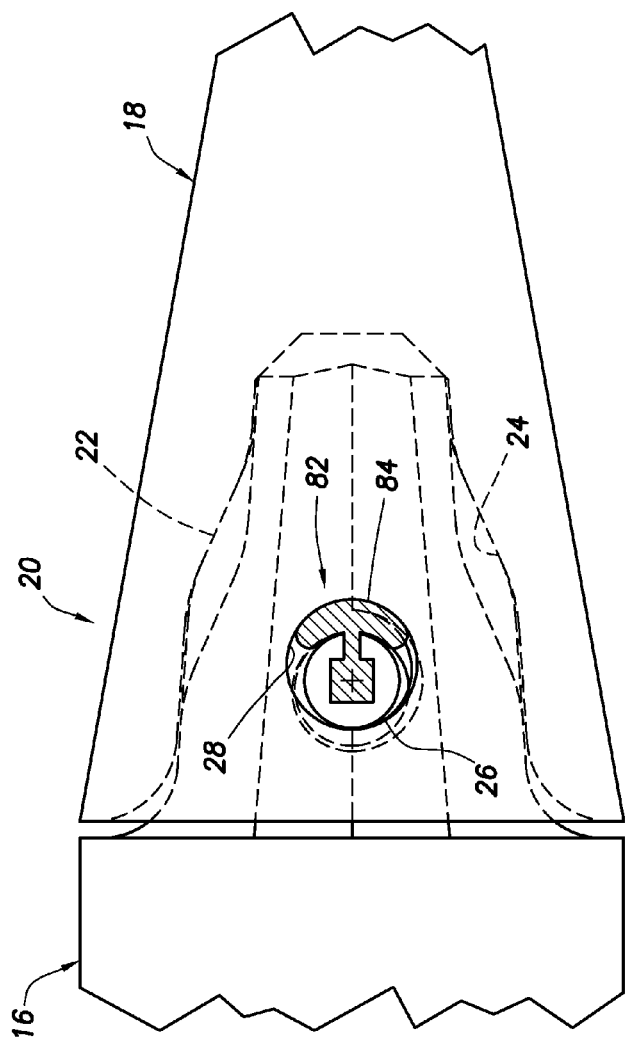
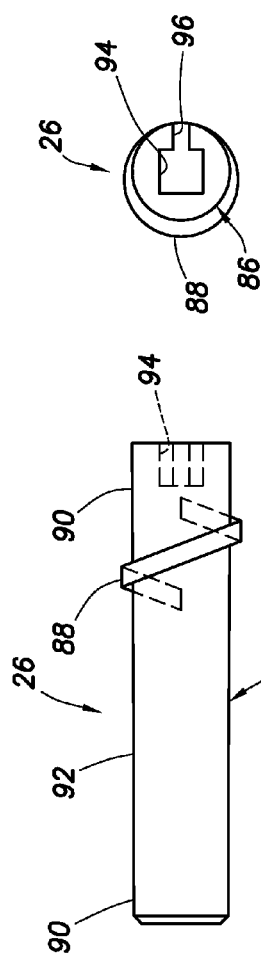
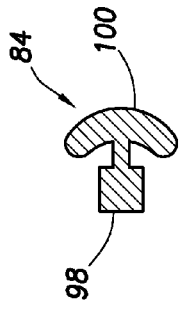

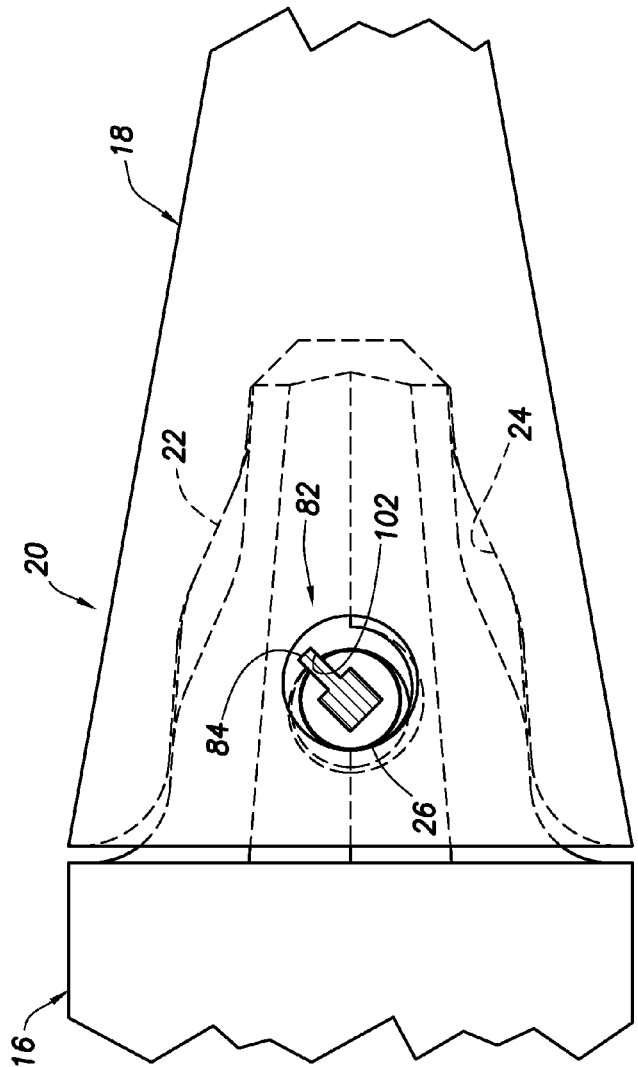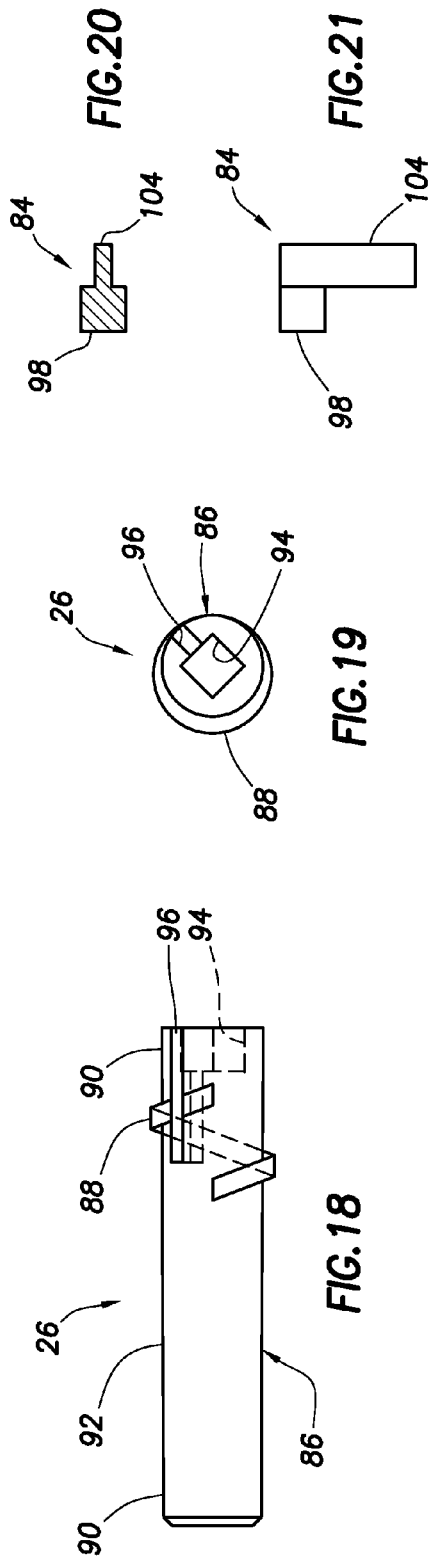

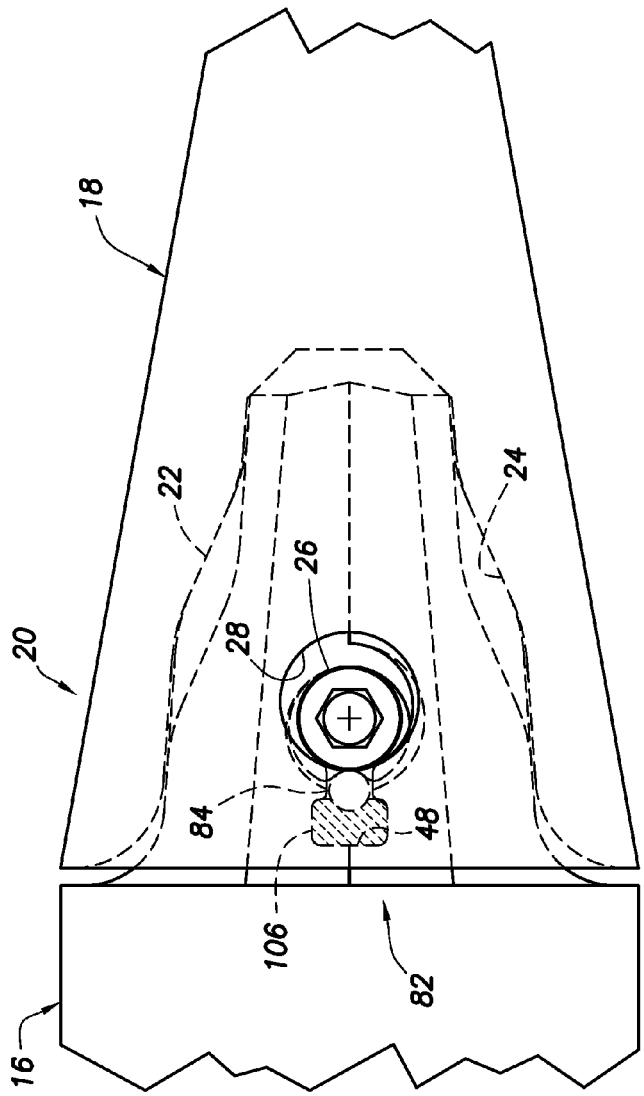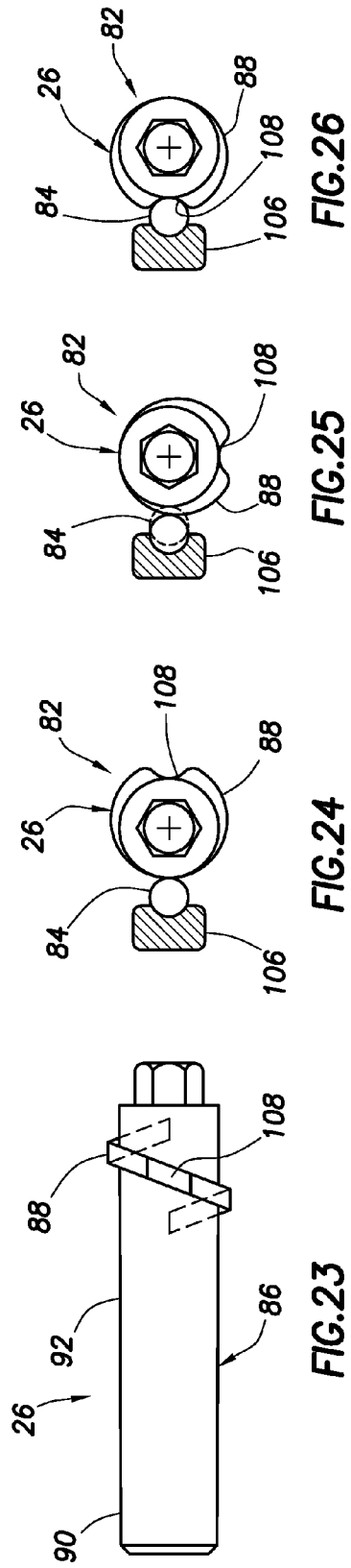

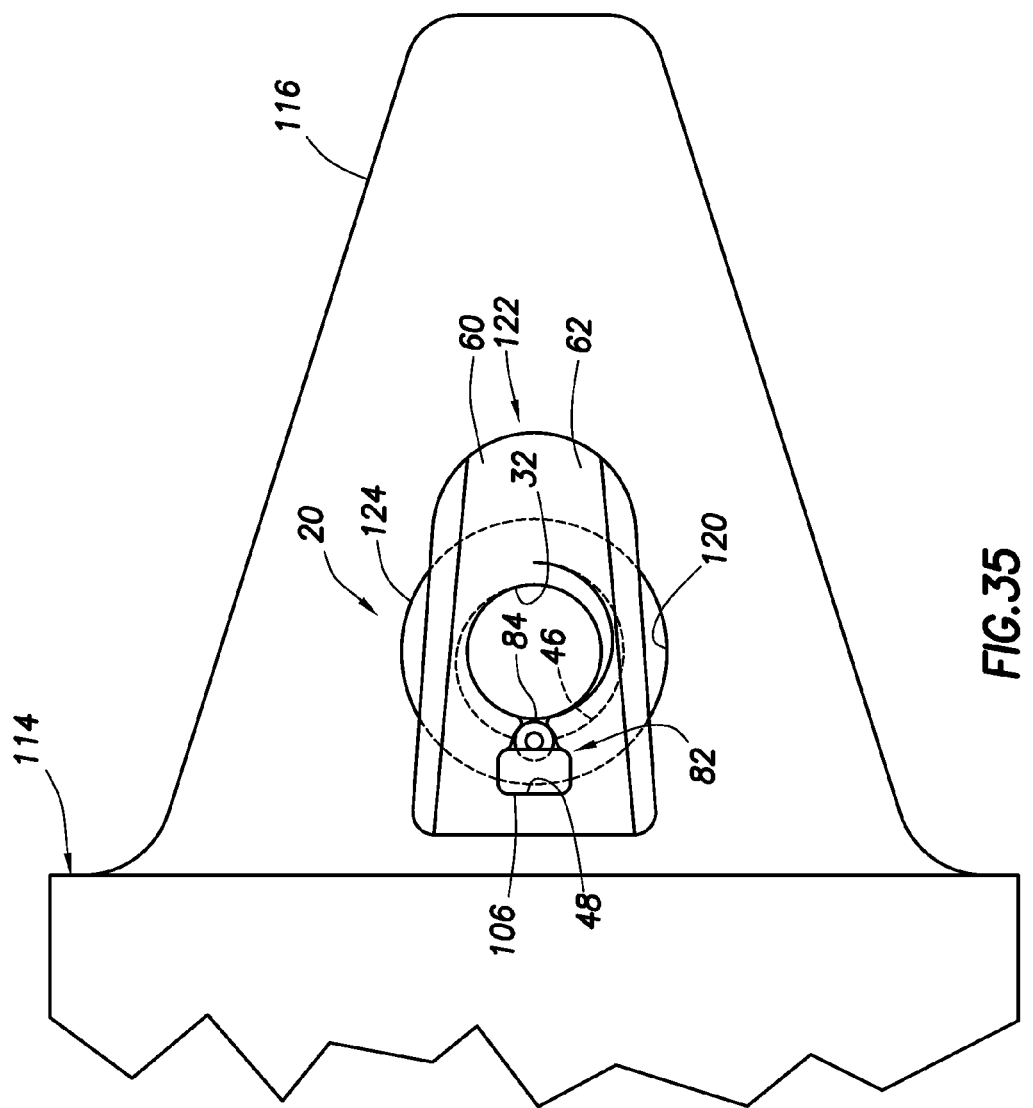

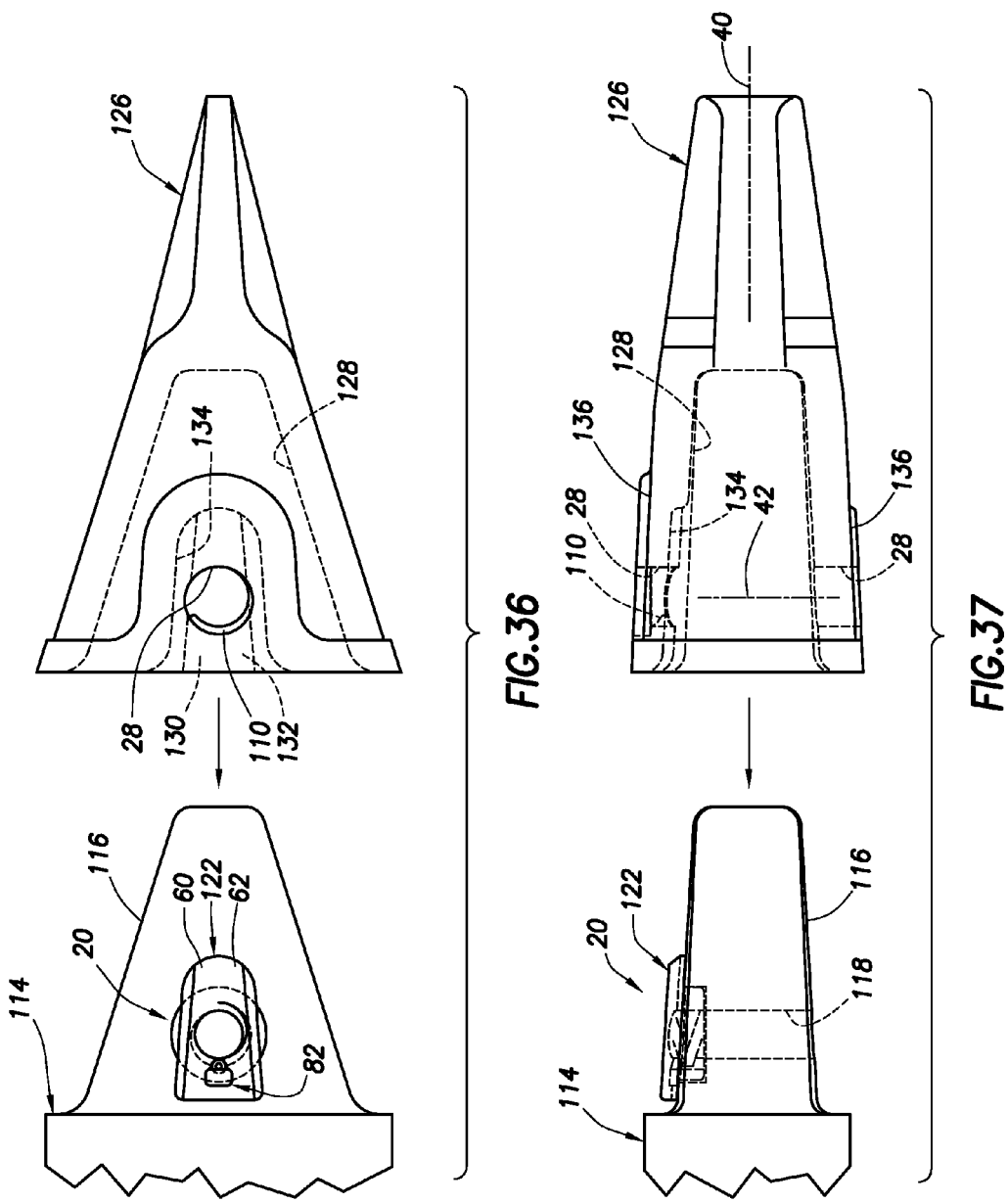

RETROFITTED EXCAVATOR TOOTH ATTACHMENT

CROSS-REFERENCE TO RELATED APPLICATIONS

This application is a division of prior application Ser. No. 13/269,780 filed on 10 Oct. 2011, which claims the benefit under 35 USC §119 of the filing date of International Application No. PCT/US10/54499, filed 28 Oct. 2010, which claims priority to prior application Ser. No. 12/608,803, filed 29 Oct. 2009, now U.S. Pat. No. 7,980,011, which is a continuation-in-part of prior application Ser. No. 12/408,880, filed 23 Mar. 2009, now abandoned. The entire disclosures of these prior applications are incorporated herein by this reference.

BACKGROUND

This disclosure relates generally to equipment utilized and operations performed in conjunction with excavating and, in one example described below, more particularly provides a retrofitted excavator tooth attachment.

Excavator implements, such as excavator buckets, trenchers, etc., are commonly provided with one or more teeth releasably secured to the implements for convenient replacement as the teeth wear out. In the past, such excavation teeth were secured to noses on adaptors positioned on lips of the implements, with various forms of pins, wedges, etc. being used to releasably attach the teeth.

Early attachment pins were installed and removed by hammer impact, which was later widely recognized as unsafe and inconvenient, leading to development of non-impact methods of attachment. Unfortunately, most of these non-impact attachment systems are unduly complex, costly, inconvenient to use and/or unsuited to the hostile environment of an excavation operation.

Therefore, it will be appreciated that advancements are needed in the art of excavator tooth attachment. Such advancements could include provision of an improved attachment system which can be retrofit to existing adaptor noses, or which can be provided for newly designed adaptor noses.

SUMMARY

In the disclosure below, an excavator tooth and an attachment system are provided which solve at least one problem in the art. One example is described below in which an excavator tooth is secured to an adaptor nose using a unique attachment system. In another example, the attachment system can be retrofit to an existing adaptor nose.

In one aspect, this disclosure provides to the art an attachment system for an excavator implement which can include an excavator tooth having a nose-receiving pocket formed therein, an insert received in a recess formed in an adaptor nose and a threaded fastener which releasably secures the tooth on the nose. The fastener can have a helical fastener thread formed thereon which is eccentric relative to a body of the fastener.

In another aspect, an excavator tooth for use on a nose of an excavator adaptor can include a nose-receiving pocket bounded by opposing side walls, and at least one of the side walls having an insert-receiving recess and generally planar insert-engaging interface surfaces formed therein. One interface surface can resist rotation of the tooth about a longitudinal axis of the tooth in one direction, and another interface surface can resist rotation of the tooth about the longitudinal axis in an opposite direction.

In yet another aspect, an excavator tooth can include a nose-receiving pocket bounded by opposing side walls, with at least one of the side walls having an insert-receiving recess internally formed thereon. The recess can receive an insert installed in an adaptor nose.

These and other features, advantages and benefits will become apparent to one of ordinary skill in the art upon careful consideration of the detailed description of representative examples below and the accompanying drawings, in which similar elements are indicated in the various figures using the same reference numbers.

BRIEF DESCRIPTION OF THE DRAWINGS

FIGS. 13-16 are views of an attachment system for the tooth and adaptor nose.

FIGS. 17-21 are views of another configuration of the attachment system.

FIGS. 22-26 are views of yet another configuration of the attachment system.

FIG. 35 is an elevational view of the insert installed in the adaptor nose.

FIGS. 36 & 37 are elevational and plan views of installation of a tooth on the adaptor nose.

DETAILED DESCRIPTION

Figure 1:
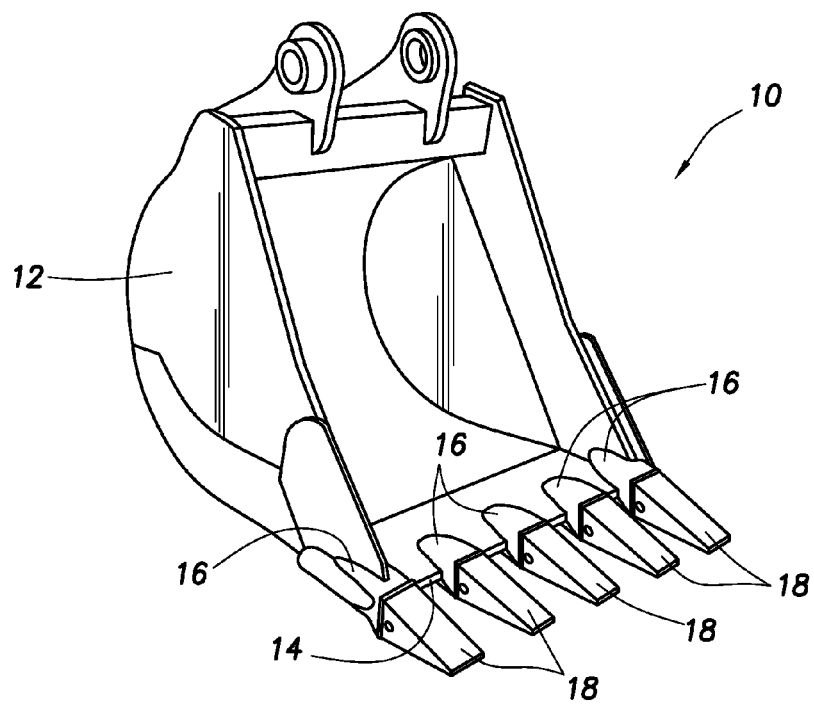
FIG. 1 is a perspective view of an excavator implement embodying principles of the present disclosure.

Representatively illustrated in FIG. 1 is an excavator implement 10 which embodies principles of this disclosure. The implement 10 is depicted in FIG. 1 as including a bucket 12 having a material-engaging lower lip 14. Mounted along the lip 14 are spaced apart adaptors 16. The adaptors 16 allow for mounting excavator teeth 18 along the lip 14, so that the implement 10 is more efficient in breaking up and scooping material into the bucket 12.

At this point, it should be noted that the implement 10 as depicted in FIG. 1 is merely one example of a wide variety of implements which can incorporate the principles of this disclosure described more fully below. Other types of implements, such as trenchers, etc., can utilize the principles of this disclosure. Indeed, most excavation equipment which utilizes replaceable excavator teeth can benefit from the principles of this disclosure.

Multiple configurations of the adaptors 16 and teeth 18 are depicted in the drawings and are described below for purposes of illustration and example, so that a person skilled in the art can appreciate how to make and use the principles of this disclosure, and the advantages thereof. However, it should be clearly understood that the principles of this disclosure are not limited at all to the specific configurations of the adaptors 16, teeth 18 and associated components described herein. Instead, the principles of this disclosure are applicable to a wide variety of excavator teeth, adaptor and attachment system configurations.

Figure 2:
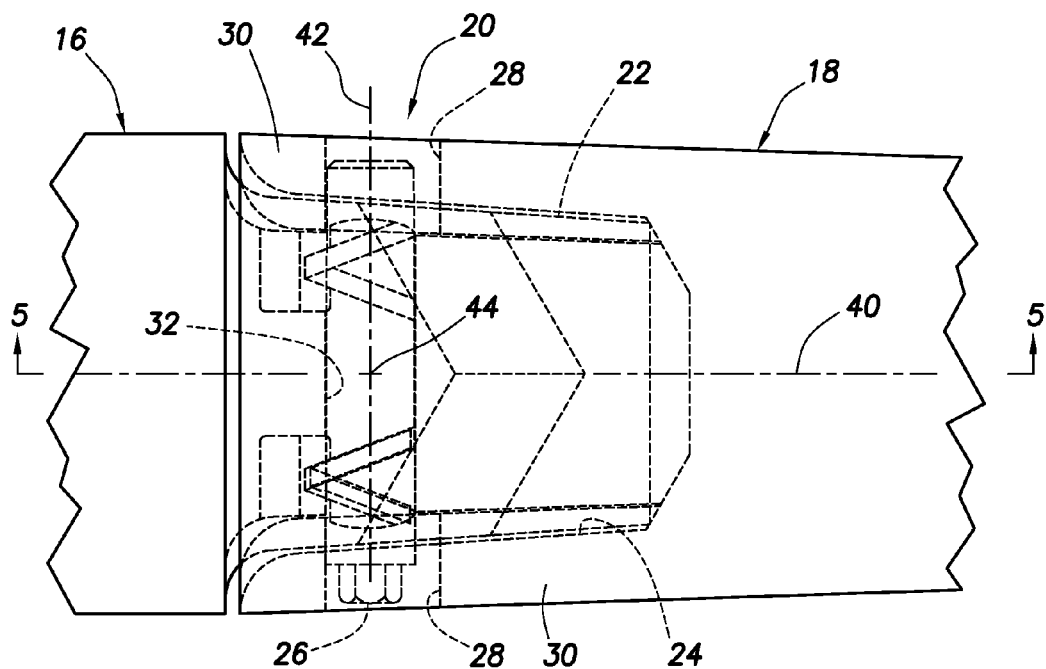
FIG. 2 is a top plan view of an excavator tooth, adaptor nose and fastener, each of which embodies principles of the present disclosure and may be used on the implement of FIG. 1.

Referring additionally now to FIG. 2, a top plan view of engaged portions of an adaptor 16 and tooth 18 are representatively illustrated. FIG. 2 also depicts an attachment system 20 which is used to releasably secure the tooth 18 to the adaptor 16.

In FIG. 2 it may be seen that a "male" nose 22 of the adaptor 16 is received within a "female" pocket 24 formed in a rearward end of the tooth 18. To releasably secure the tooth 18 on the nose 22, a fastener 26 is installed in openings 28 formed through opposing side walls 30 of the tooth. The fastener 26 also extends through another opening 32 formed laterally through the nose 22.

Each of these components is described more fully below, along with the advantages derived from their unique construction and operation. Among these advantages are the secure, reliable, economical, robust and convenient attachment of the tooth 18 to the adaptor nose 22 using the attachment system 20, as well as the fully stabilized complementary engagement between the tooth and the adaptor nose which beneficially reduces wear between these components.

Figure 3:
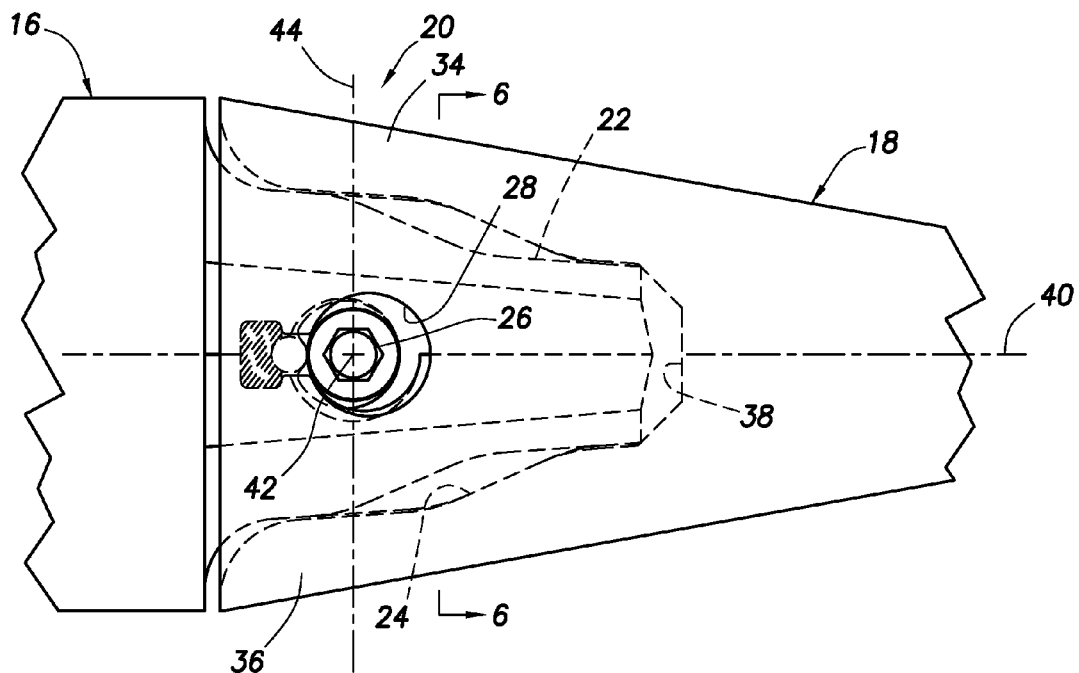
FIG. 3 is a side view of the excavator tooth, adaptor nose and fastener of FIG. 2.

Referring additionally now to FIG. 3, a side view of the attachment system 20 is representatively illustrated. In this view, it may be seen that the tooth pocket 24 is bounded by an upper wall 34, a lower wall 36 and an end wall 38, as well as by the side walls 30 described above.

The tooth 18 and adaptor nose 22 are aligned along a longitudinal axis 40 of the tooth. The fastener 26 is aligned with a lateral axis 42 which extends transversely (perpendicular to the longitudinal axis 40). Another axis 44 is orthogonal to a plane defined by the other two axes 40, 42, and intersects the upper and lower walls 34, 36.

Note that, although the axes 40, 42 are depicted in the drawings as being horizontally oriented, and the axis 44 is depicted as being vertically oriented, the axes could be oriented in any directions when the tooth 18 is attached to the adaptor nose 22, and when the implement 10 is used in excavating operations. Thus, the orientations of the axes 40, 42, 44 shown in the drawings are merely for convenience of description, illustration and example.

Figure 4:
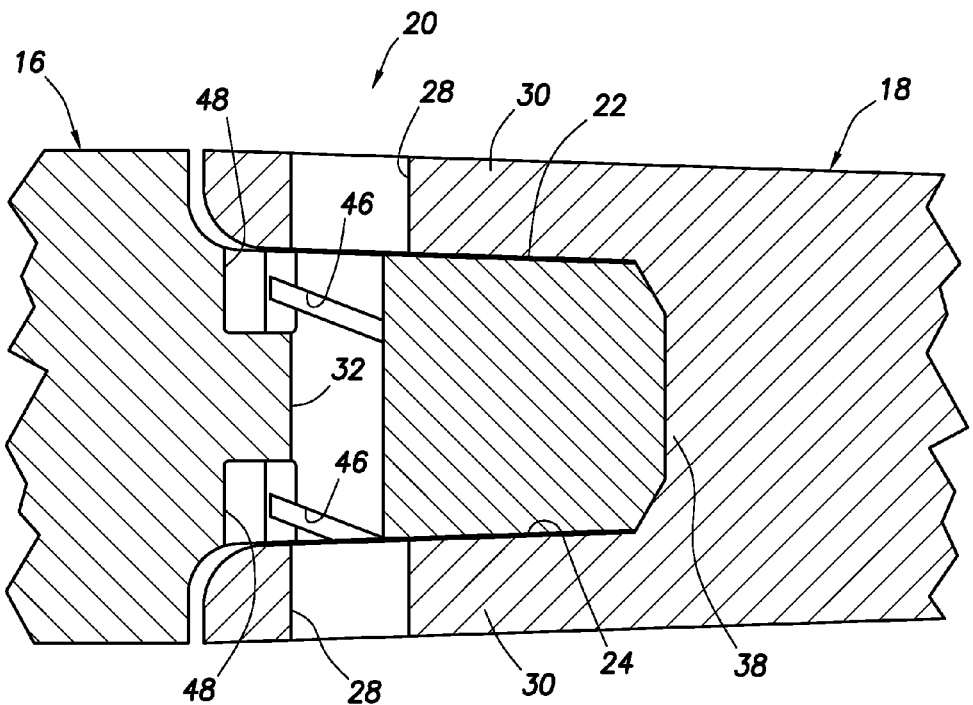
FIG. 4 is a cross-sectional view of the tooth and adaptor nose, taken along line 4-4 of FIG. 8.

Referring additionally now to FIG. 4, a cross-sectional view of the adaptor 16 and tooth 18 is representatively illustrated. In this view, several additional features of the attachment system 20 can be more clearly seen.

The opening 32 has helical threads 46 at each opposite end thereof. Note that the threads 46 are not coaxial with the openings 28, 32, but are instead eccentric relative to the openings. Preferably, the threads 46 are tangential to one side of the opening 32 (as described more fully below), and are discontinuous, in that each of the threads terminates without connecting with the thread at the other end of the opening.

The two threads 46 permit the fastener 26 to be installed from either end of the openings 28, 32. The terminations of the threads 46 in the opening 32 prevents the fastener 26 from being installed too far into the opening. The eccentric position of the threads 46 relative to the openings 28, 32 allows a body of the fastener 26 to fully contact the openings upon installation, thereby providing increased surface area and reduced wear, as described more fully below.

The openings 28 are also not coaxial with the opening 32. In addition to the benefits discussed above, the eccentric positioning of the openings 28, 32 also provides for automatic, intuitive alignment of the fastener 26 with the openings at installation, as described more fully below.

Recesses 48 (used for one example of a lock device 82 described below) are depicted in FIG. 4 as being formed in the nose portion 22 adjacent the opening 32 and threads 46. Various devices for locking the fastener 26 in the tooth 18 and adaptor nose 22 are described more fully below.

Figure 5:
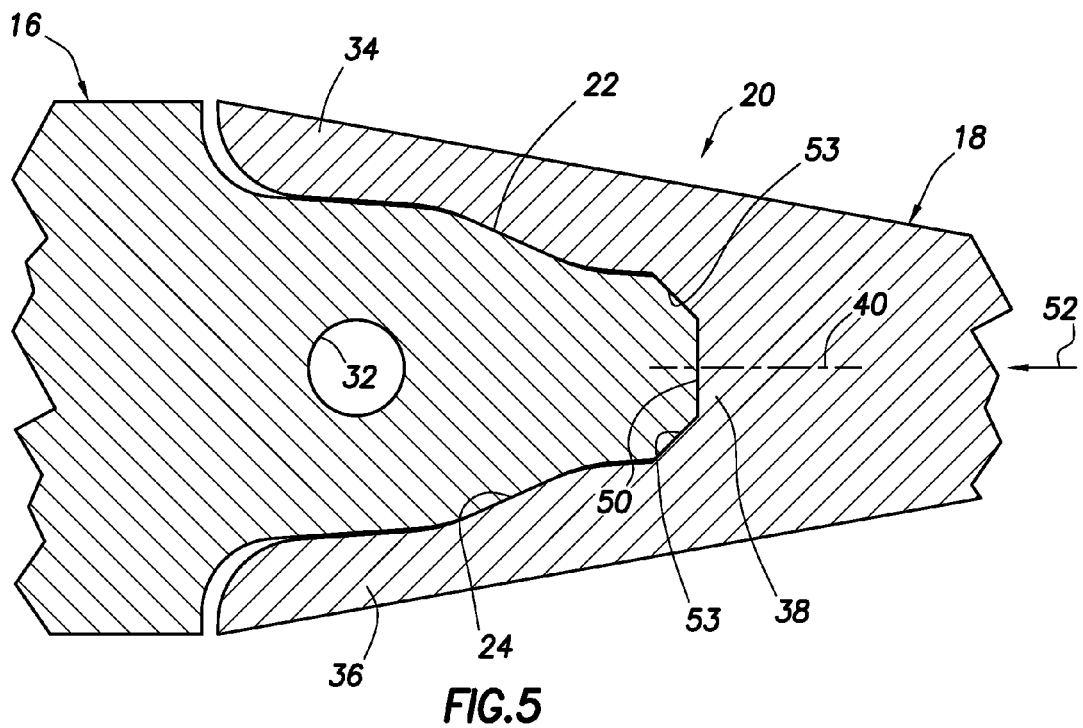
FIG. 5 is a cross-sectional view of the tooth and adaptor nose, taken along line 5-5 of FIGS. 2 & 6.

Referring additionally now to FIG. 5, another cross-sectional view of the tooth 18 and adaptor nose 22 is representatively illustrated. In this view it may be seen that the tooth 18 abuts the nose 22 primarily at a planar interface surface 50 formed on the end wall 38. The surface 50 is oriented orthogonal to the longitudinal axis 40 of the tooth 18 and thereby provides substantial resistance to force 52 applied to the tooth along the longitudinal axis.

In addition, inclined planar interface surfaces 53 are provided which, in addition to resisting the longitudinal force 52, also function to center and stabilize the tooth 18 relative to the longitudinal axis 40. The surfaces 53 are preferably inclined relative to the longitudinal and orthogonal axes 40, 44, but are parallel to the lateral axis 42 of the tooth 18.

Figure 6:
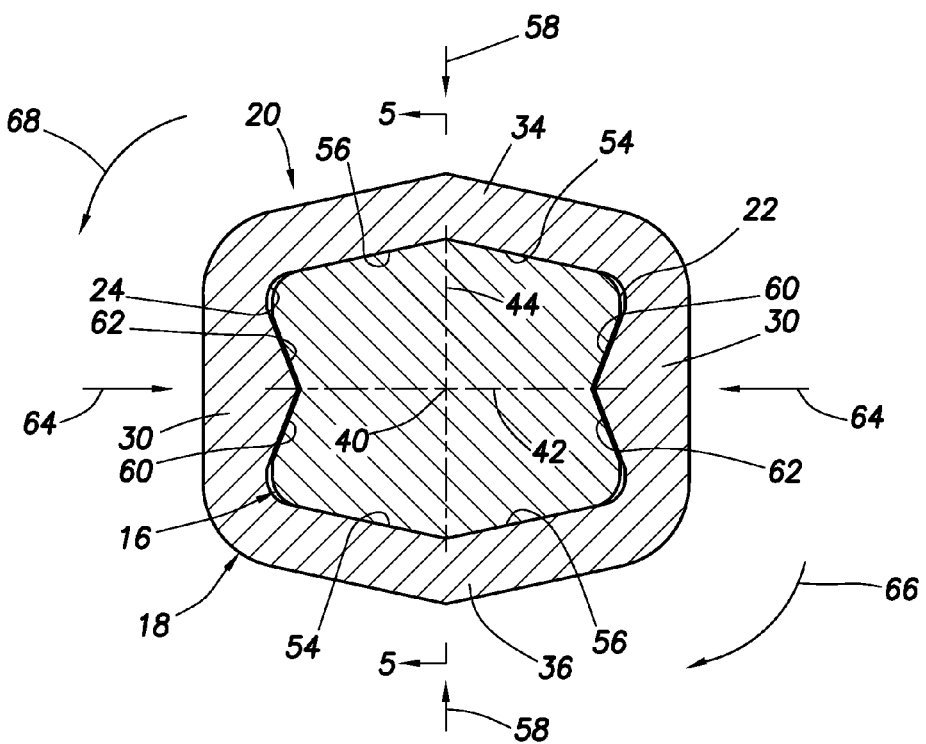
FIG. 6 is a cross-sectional view of the tooth and nose, taken along line 6-6 of FIG. 3.

Referring additionally now to FIG. 6, another cross-sectional view of the tooth 18 and adaptor nose 22 is representatively illustrated. In this view it may be seen that additional inclined interface surfaces are utilized in the attachment system 20 to resist various other forces applied to the tooth 18, and to stabilize the tooth on the adaptor nose 22.

Planar interface surfaces 54, 56 formed on the upper and lower walls 34, 36 resist forces 58 applied to the tooth along the axis 44 and function to center and stabilize the tooth 18 on the adaptor nose 22 in response to these forces. Planar interface surfaces 60, 62 formed on the side walls 30 resist forces 64 applied to the tooth 18 along the axis 42 and function to center and stabilize the tooth on the adaptor nose 22 in response to these forces.

In addition, the surfaces 54, 62 function to resist rotation of the tooth 18 about the adaptor nose 22 due to torque 66 applied to the tooth about the longitudinal axis 40. Similarly, the surfaces 56, 60 function to resist rotation of the tooth 18 about the adaptor nose 22 due to oppositely directed torque 68 applied about the axis 40.

Preferably, each of the interface surfaces 54, 56, 60, 62 is inclined relative to each of the axes 40, 42, 44 for enhanced stabilization of the tooth 18 on the adaptor nose 22. However, the surfaces 54, 56, 60, 62 could be otherwise oriented, without departing from the principles of this disclosure. Furthermore, since the tooth pocket 24 is substantially complementarily shaped relative to the adaptor nose 22, the nose has interface surfaces formed thereon which are similarly shaped and oriented as the surfaces 50, 53, 54, 56, 60, 62 and other interface surfaces described herein.

The interface surfaces 60, 62 combine to form a convex portion of the pocket 24, thereby increasing the lateral thickness of the side walls 30. This is advantageous for providing sufficient contact surface area between the openings 28 and each end of the fastener 26, as described more fully below.

Figure 7:
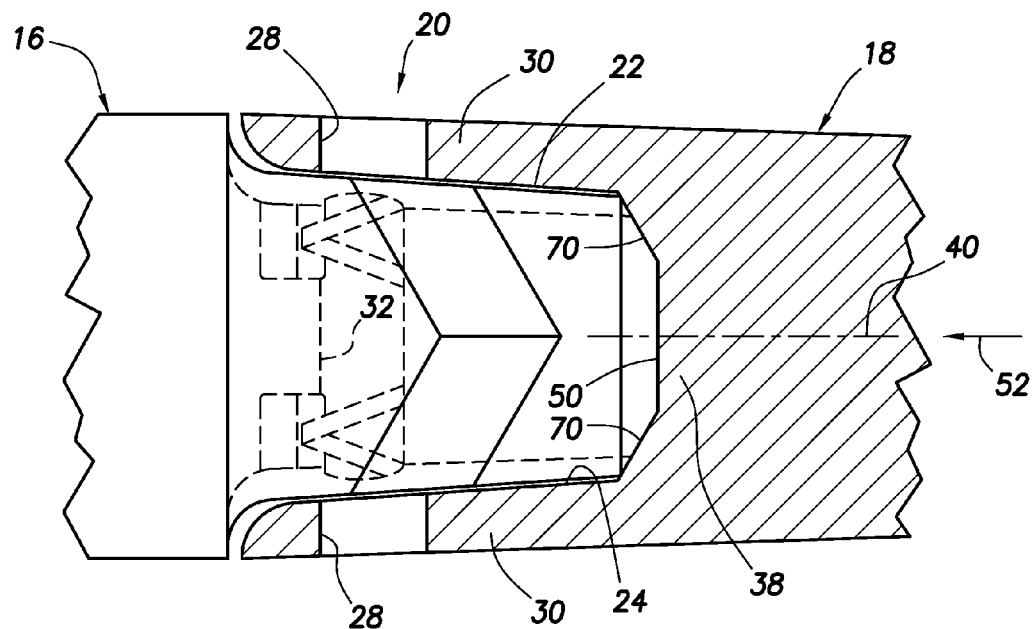
FIG. 7 is a cross-sectional view of the tooth and a top plan view of the nose therein.

Referring additionally now to FIG. 7, another cross-sectional view of the tooth 18 on the adaptor nose 22 is representatively illustrated. In this view it may be seen that additional planar interface surfaces 70 are formed on the end wall 38 adjacent and on opposite sides of the surface 50.

The surfaces 70 resist the longitudinal force 52, and also function to center and stabilize the tooth 18 relative to the longitudinal axis 40 in response to the force. The surfaces 70 are preferably inclined relative to the longitudinal and lateral axes 40, 42, but are parallel to the orthogonal axis 44 of the tooth 18. In the examples depicted in the drawings, the surfaces 53, 70 intersect the surface 50 at a generally rectangular periphery thereof, due to the orientations of these surfaces, but other configurations may be used, if desired.

Figure 8:
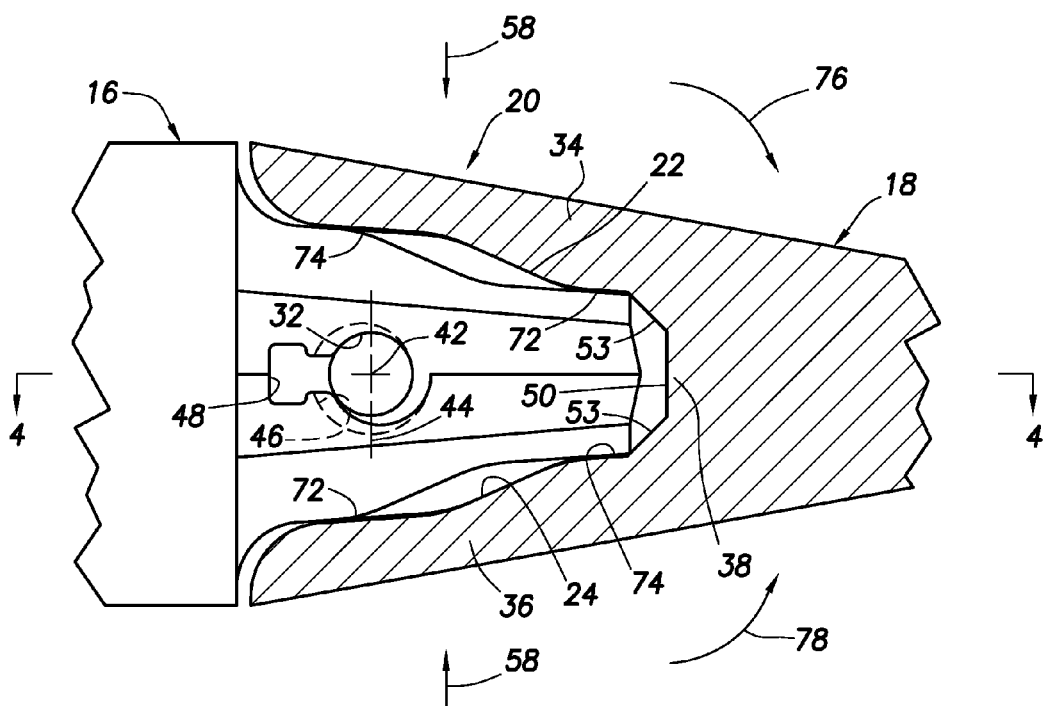
FIG. 8 is a cross-sectional view of the tooth and a side view of the nose therein.

Referring additionally now to FIG. 8, another cross-sectional view of the tooth 18 on the adaptor nose 22 is representatively illustrated. In this view it may be seen that the upper and lower walls 34, 36 have planar interface surfaces 72, 74 formed thereon which resist the forces 58 applied to the tooth along the axis 44.

The surfaces 72, 74 are preferably longitudinally spaced apart from each other along each of the upper and lower walls 34, 36, and are preferably parallel to each other. The surfaces 72, 74 are also preferably offset relative to each other in a direction perpendicular to the surfaces. The surfaces 72, 74 could be somewhat inclined relative to each other, if desired, but preferably such relative inclination is minimal.

The surfaces 72, 74 are preferably inclined somewhat relative to the longitudinal axis 40 and the orthogonal axis 44, but are parallel to the lateral axis 42. The surfaces 72, 74 could be parallel to the longitudinal axis 40, if desired.

The surfaces 72 function to resist rotation of the tooth 18 about the adaptor nose 22 due to torque 76 applied to the tooth about the lateral axis 42. Similarly, the surfaces 74 function to resist rotation of the tooth 18 about the adaptor nose 22 due to oppositely directed torque 78 applied about the axis 42.

Figure 9:
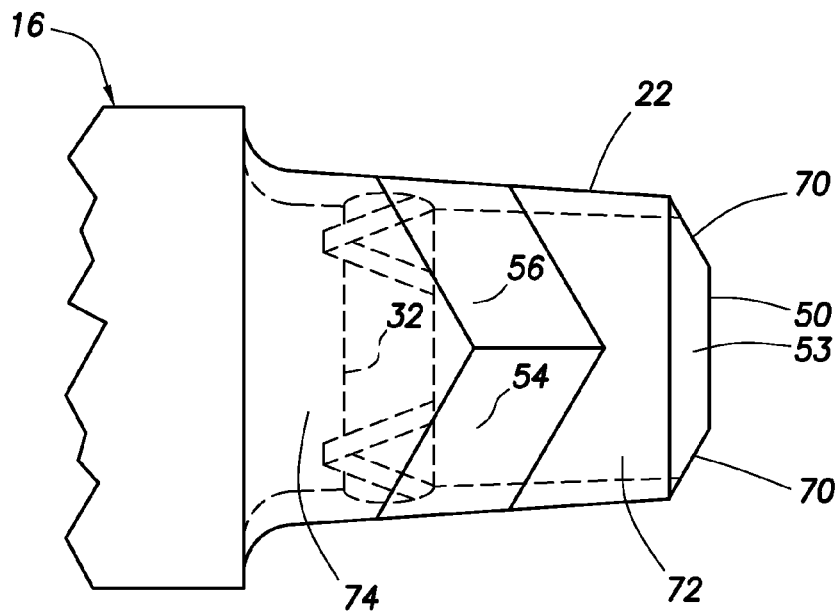
FIG. 9 is a top plan view of the nose.
Figure 10:
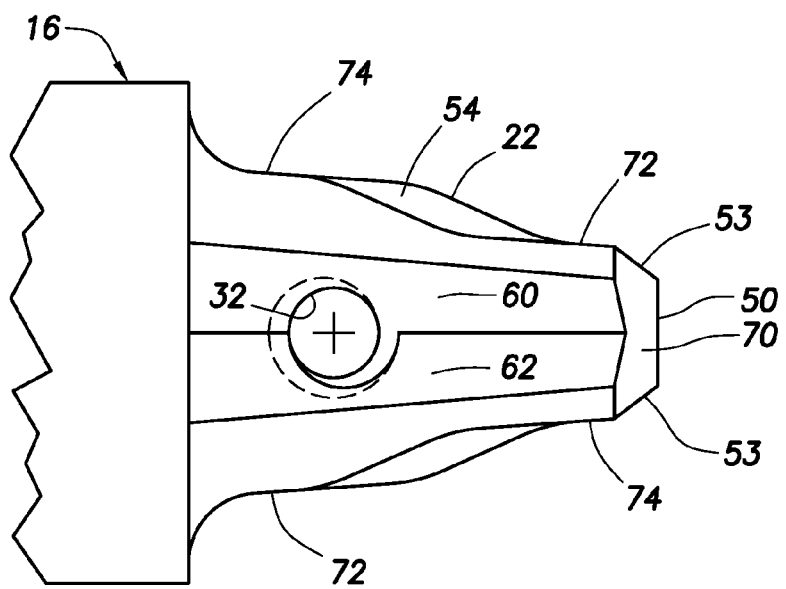
FIG. 10 is a side view of the nose.

Referring additionally now to FIGS. 9 & 10, respective top and side views of the adaptor nose 22 are representatively illustrated, apart from the remainder of the attachment system 20. In these views, the interface surfaces described above as being formed in the tooth pocket 24 are indicated on the adaptor nose 22 to demonstrate how the surfaces on the nose and pocket cooperate to form a complementarily shaped attachment and stabilization system.

Figure 11:
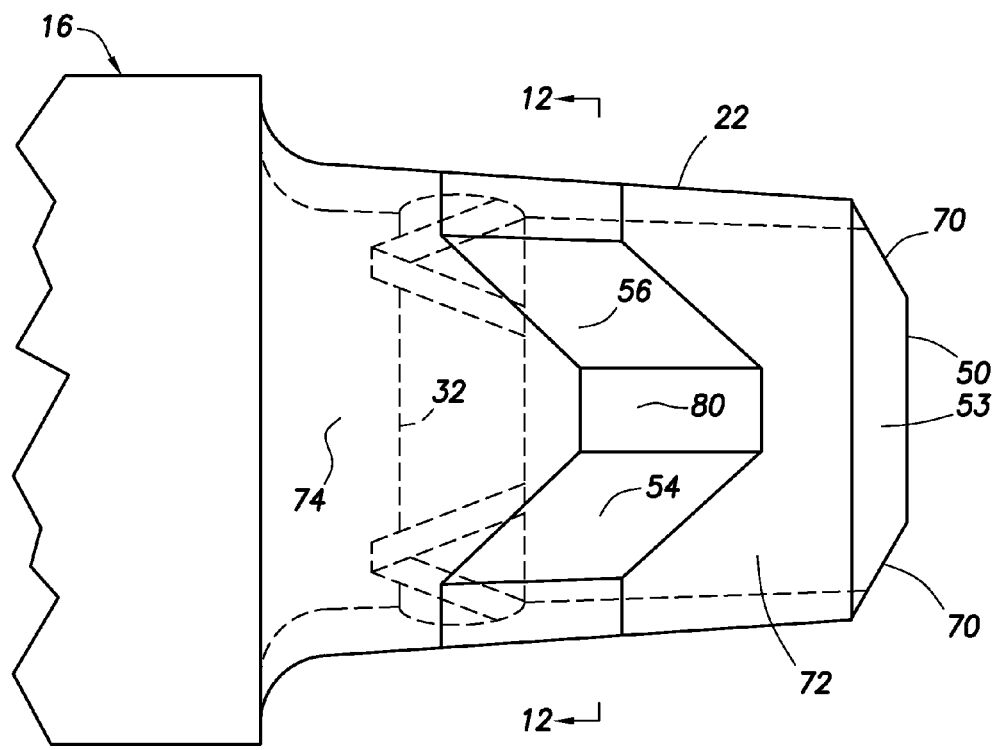
FIG. 11 is a top plan view of another configuration of the nose.
Figure 12:
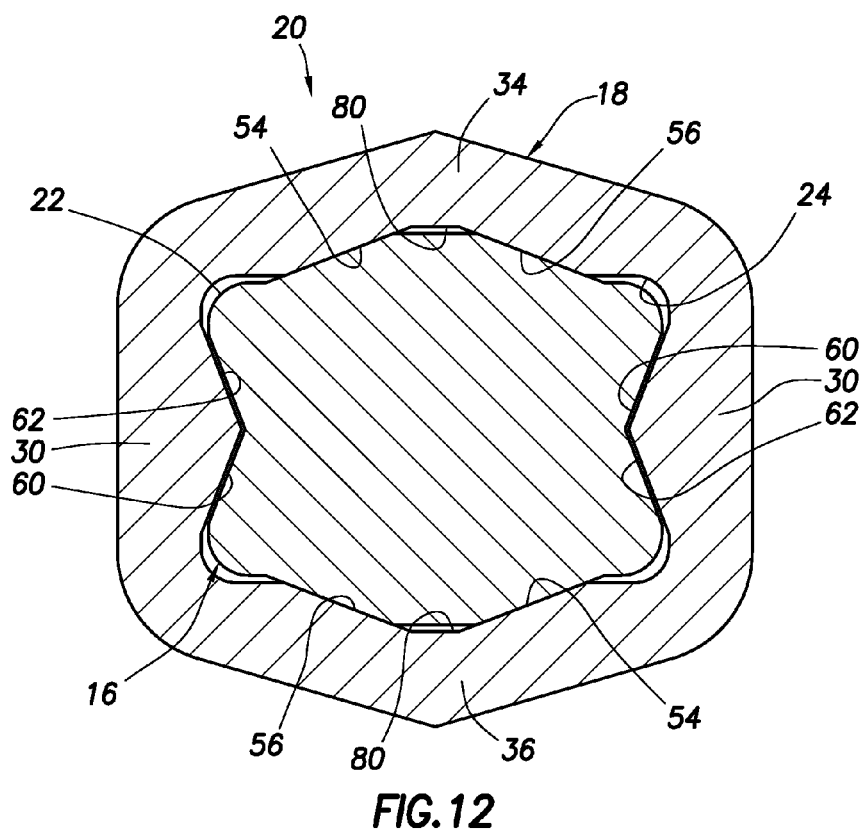
FIG. 12 is a cross-sectional view of the nose configuration of FIG. 11 in a complementarily shaped configuration of the tooth.

Referring additionally now to FIGS. 11 & 12, another configuration of the tooth 18 and adaptor nose 22 is representatively illustrated. In this configuration, the interface surfaces 54, 56 on the upper and lower walls 34, 36 are separated by another inclined planar surface 80. Otherwise, the configuration of FIGS. 11 & 12 is substantially similar to the configuration of FIGS. 2-10 and functions in essentially the same way. This demonstrates that various configurations of the attachment system 20 may be utilized in keeping with the principles of this disclosure.

Referring additionally now to FIGS. 13-16, the attachment system 20 is representatively illustrated, along with components of a lock device 82 for preventing inadvertent removal of the fastener 26 from the adaptor nose 22 and tooth 18. FIG. 13 depicts the lock device 82 installed in the assembled adaptor nose 22 and tooth 18, FIGS. 14 & 15 depict the specially constructed fastener 26, and FIG. 16 depicts a lock member 84 of the lock device.

The fastener 26 as depicted in FIG. 14 has an elongated body 86, with a helical thread 88 formed near one end of the body. The thread 88 is eccentric relative to the body 86, such that the thread is tangential with one lateral side of the body.

The body 86 is generally cylindrical-shaped, but may be tapered somewhat (e.g., tapering inward from the thread 88 end toward the unthreaded end approximately one degree on a side), in order to facilitate removal of the fastener 26 from the opening 32 in the adaptor nose 22. Contact surfaces 90 are provided at each end of the body 86 for contacting the opening 28 in each side of the tooth 18 (as depicted in FIG. 13), and an intermediate portion of the body provides a contact surface 92 which contacts the opening 32 in the adaptor nose 22.

When installing the fastener 26, the body 86 is inserted through the opening 28 on one side of the tooth 18, and into the opening 32 in the adaptor nose 22. The fastener 26 is rotated until the thread 88 aligns with the opening 28.

Note that the thread 88 is eccentrically offset relative to the body 86 of the fastener 26 by the same amount as the opening 28 is eccentrically offset relative to the opening 32, and the thread 88 is somewhat smaller in diameter than the opening 28. Thus, it is intuitive to an operator to align the thread 88 with the opening 28 once the body 86 has been inserted into the opening 32 of the adaptor nose 22.

With the thread 88 inserted into the opening 28, the thread 88 will also be aligned for ready engagement with the respective one of the threads 46 in the adaptor nose 22. The fastener 26 is then rotated 180 degrees (or another amount of rotation, such as 90 degrees, if desired, depending upon the depth of the thread 46 in the adaptor nose 22).

At this point, with the contact surfaces 90 engaging the openings 28, the contact surface 92 engaged in the opening 32 and the threads 46, 88 engaged with each other, the tooth 18 is secured onto the adaptor nose 22. The lock device 82 can then be used to prevent unintended unthreading of the fastener 26.

Note that a socket 94 is provided in one end of the fastener 26 for use of an appropriate tool to rotate the fastener when threading or unthreading it in the attachment system 20. The lock device 82 utilizes this socket 94, in conjunction with a slot 96 extending laterally between the socket and the outer surface of the body 86, to retain the lock member 84.

As depicted in FIG. 16, the lock member 84 is complementarily shaped relative to the socket 94 and slot 96 on one side 98 of the lock member, and has a lobe 100 extending outwardly from an opposite side. The lobe 100 has an outer curvature which matches that of the opening 28 so that, when the fastener 26 is appropriately threaded into the opening 32 and the side 98 of the lock member 84 is inserted into the socket 94 and slot 96, the lobe will cooperatively engage the opening 28 to thereby prevent unthreading of the fastener.

Preferably, the lock member 84 is made of a resilient material, such as an appropriately durable elastomer. The lock member end 98 and lobe 100 are preferably sized for an interference fit in the respective socket 94 and opening 28, to thereby prevent inadvertent dislodging of the lock member from the fastener 26 and tooth 18.

In the lock device 82 of FIGS. 13-16, the lock member 84 engages the opening 28 to prevent unintentional unthreading of the fastener 26. However, other types of lock devices can be used, if desired.

Referring additionally now to FIGS. 17-21, another configuration of the lock device 82 is representatively illustrated. In this configuration, the lock member 84 engages the fastener 26 and a slot 102 formed in the adaptor nose 22 adjacent the opening 32 to prevent inadvertent unthreading of the fastener.

The lock member 84 as depicted in FIGS. 20 & 21 includes an elongated key 104 which is inserted into the aligned slot 96 in the fastener 26 and the slot 102 in the adaptor nose 22 after the fastener has been appropriately threaded into the adaptor nose. The slot 96 in the fastener 26 is appropriately elongated for this purpose, as depicted in FIGS. 18 & 19. Again, the lock member 84 is preferably made of a resilient material and is preferably interference fit in the fastener 26 and slots 96, 102 to prevent inadvertent removal.

Referring additionally now to FIGS. 22-26, another configuration of the lock device 82 is representatively illustrated. In this configuration, the lock member 84 is in the form of a cylindrical rod which is retained in the adaptor nose 22 between the recess 48 and the opening 32 (the recess 48 is more clearly viewed in FIGS. 4 & 8).

The lock member 84 is resiliently biased toward the opening 32 by a biasing device 106 positioned in the recess 48. The biasing device 106 is preferably made of an elastomeric material, but other types of biasing devices (such as springs, etc.) could be used, if desired.

A detent 108 is formed on the thread 88 of the fastener 26, as depicted in FIG. 23. As the fastener 26 is rotated to thread the fastener into the adaptor nose 22, the thread 88 displaces the lock member 84 toward the recess 48, thereby compressing the biasing device 106. When the fastener 26 has been appropriately threaded into the adaptor nose 22, the detent 108 will be aligned with the lock member 84, and the lock member 84 will be biased by the biasing device 106 into engagement with the detent, thereby preventing inadvertent unthreading of the fastener.

This sequence is depicted in FIGS. 24-26. FIG. 24 depicts the arrangement of the fastener 26, lock member 84 and biasing device 106 when the fastener is inserted into the opening 32 and the thread 88 is aligned with the opening 28, just prior to threading the fastener into the adaptor nose 22.

FIG. 25 depicts the arrangement of the fastener 26, lock member 84 and biasing device 106 when the fastener has been rotated 90 degrees, thereby partially threading the fastener into the adaptor nose 22. Note that the lock member 84 has been displaced by the thread 88 (due to its eccentric positioning relative to the body 86) toward the biasing device 106, thereby compressing the biasing device.

FIG. 26 depicts the arrangement of the fastener 26, lock member 84 and biasing device 106 when the fastener has been rotated 180 degrees, thereby fully threading the fastener into the adaptor nose 22. Note that the lock member 84 is now engaged with the detent 108, and such engagement is resiliently maintained by the biasing device 106. Unthreading of the fastener 26 would require again compressing the biasing device 106, which may be conveniently accomplished when desired, but which would not be expected to happen inadvertently.

Figure 28:
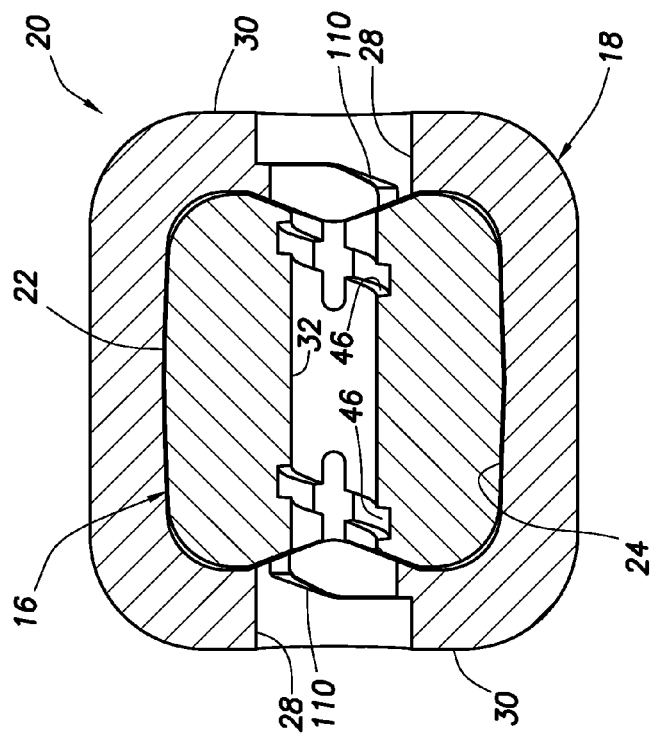
FIGS. 27-29 are views of a further configuration of the attachment system.
Figure 27:
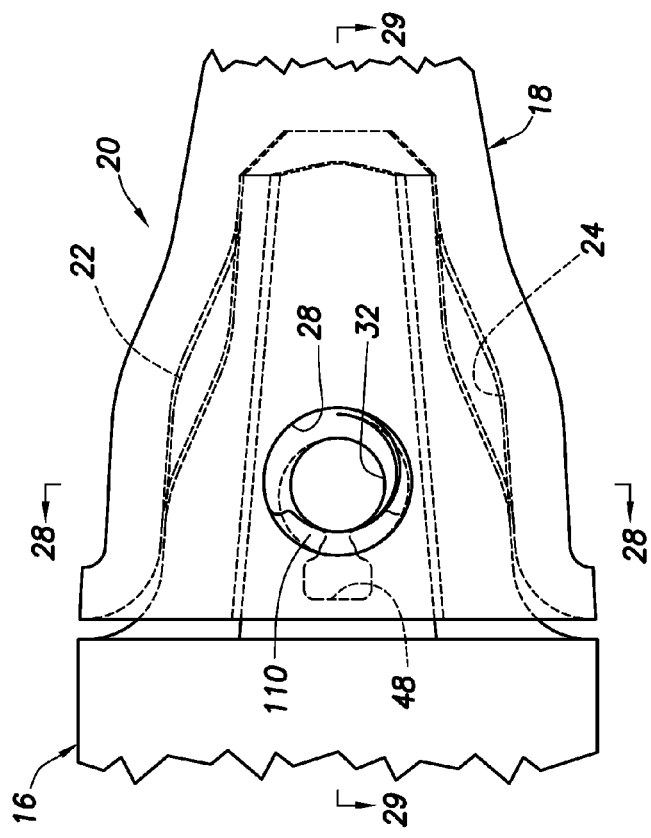
Figure 29:
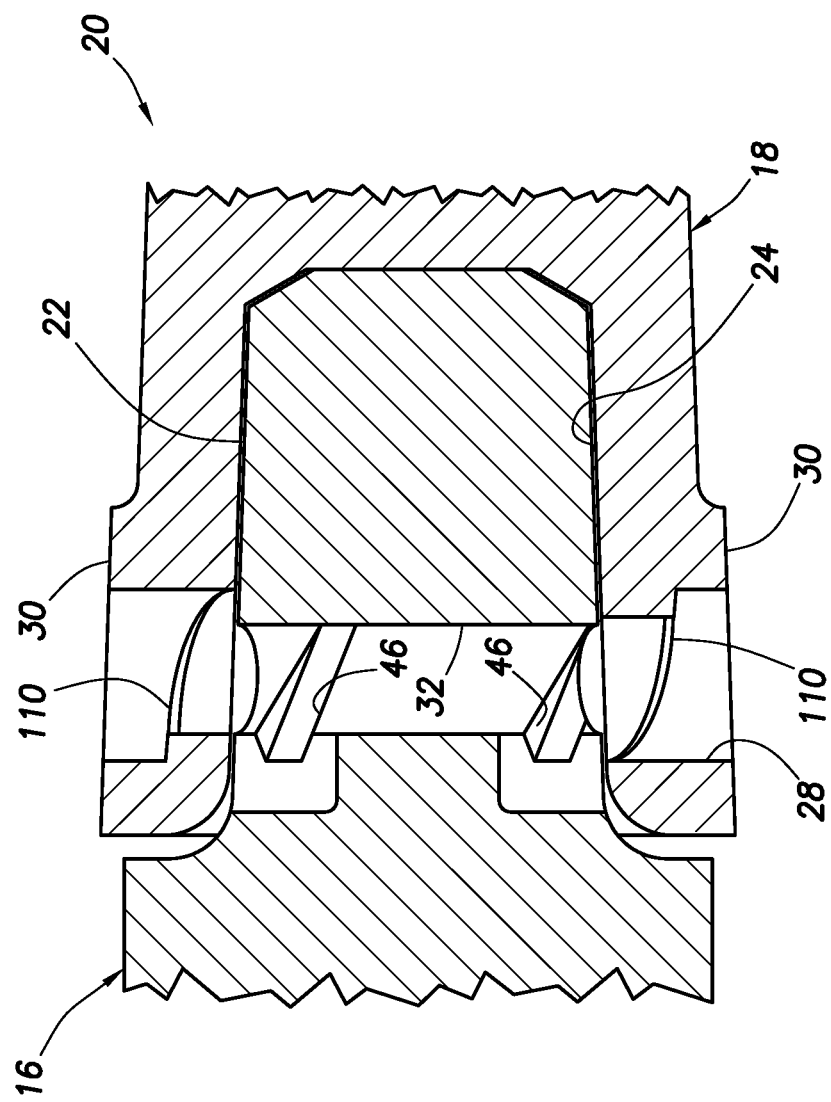

Referring additionally now to FIGS. 27-29, another configuration of the attachment system 20 is representatively illustrated. The attachment system 20 is depicted without the fastener 26 and lock device 82 for illustrative clarity, but the attachment system example of FIGS. 27-29 is configured to utilize a fastener and lock device of the type illustrated in FIGS. 22-26 and described above.

The configuration of FIGS. 27-29 differs in at least one significant way from the configuration of FIGS. 22-26, in that the openings 28 in the side walls 30 of the FIGS. 27-29 configuration have thread-engaging portions 110 formed therein. The thread-engaging portions 110 are depicted in the drawings as a partial thread or helical ramp which extends only partially circumferentially about the interior of the opening 28. However, other types of thread-engaging structures may be used, if desired.

The thread-engaging portions 110 function to engage the thread 88 on the fastener 26 as the fastener is unthreaded from the opening 32 in the nose 22. The thread 88 engages one of the portions 110 and, as the fastener is rotated counter-clockwise (as depicted in the drawings), the threaded or ramped configuration of the thread-engaging portion causes the fastener 26 to continue withdrawal from the opening 32. This provides more convenient removal of the fastener 26 from the openings 28, 30.

Note that the thread-engaging portions 110 are eccentric relative to the opening 32 in the nose 22. In addition, although the thread-engaging portions 110 are formed in each of the openings 28 in each of the side walls 30 as depicted in the drawings, the principles of this disclosure could be practiced with only one opening 28 formed through one of the side walls 30, in which case only one thread-engaging portion 110 may be used.

Figure 30:
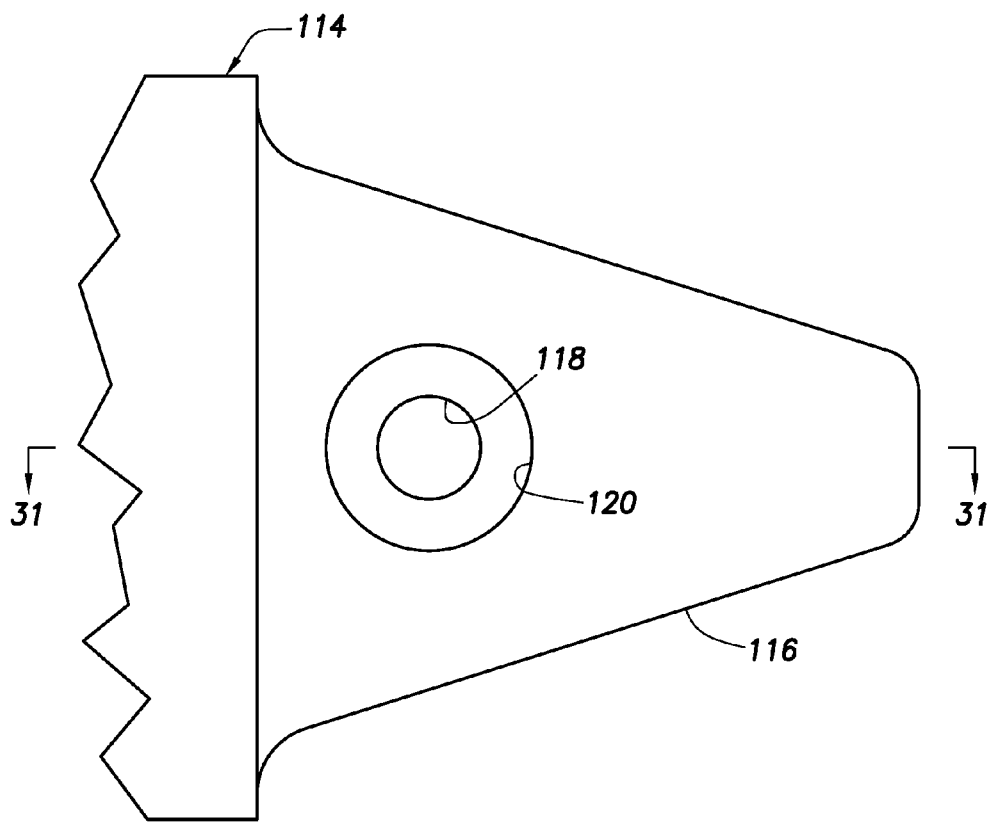
FIGS. 30 & 31 are elevational and cross-sectional views of a prior art adaptor nose.
Figure 31:
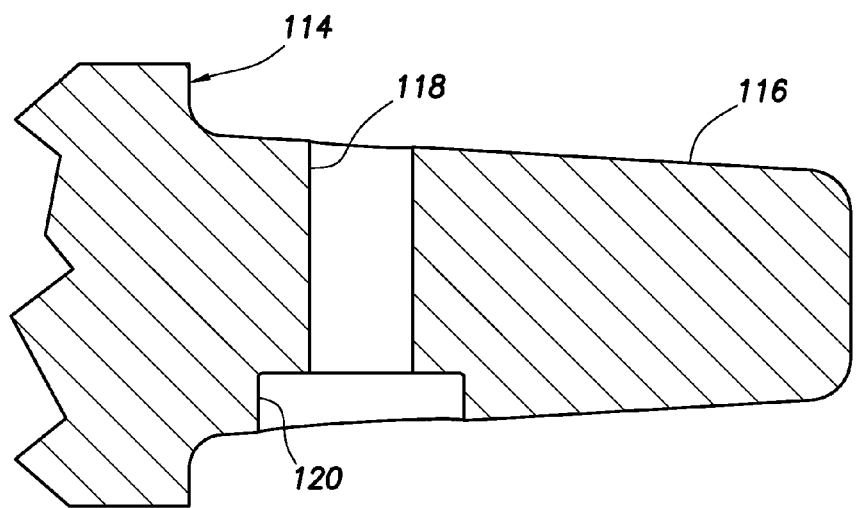

Referring additionally now to FIGS. 30 & 31, a portion of a prior art adaptor 114 is representatively illustrated. The adaptor 114 includes a nose 116 which, unfortunately, did not previously have the nose/tooth stabilization and attachment system 20 advantages described above for the adaptor nose 22 and tooth 18. However, it is possible, using the principles described below, to obtain some or all of these advantages for the adaptor 114 of FIGS. 30 & 31.

The adaptor 114 includes a laterally extending fastener-receiving opening 118. On one lateral side, a cylindrical recess 120 is formed into the nose 116. In the past, such a recess would have been used to contain a retainer for preventing inadvertent dislodging of a fastener installed in the opening 118.

Figure 34:
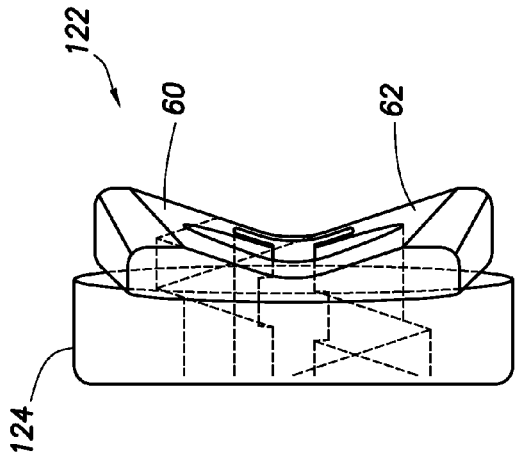
FIGS. 32-34 are elevational, plan and side views of an insert which may be used with the adaptor nose of FIGS. 30 & 31.
Figure 32:
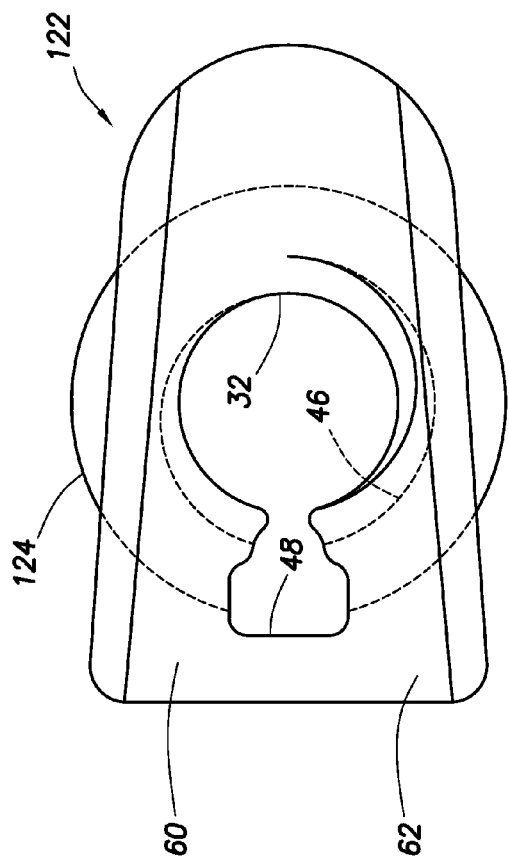
Figure 33:
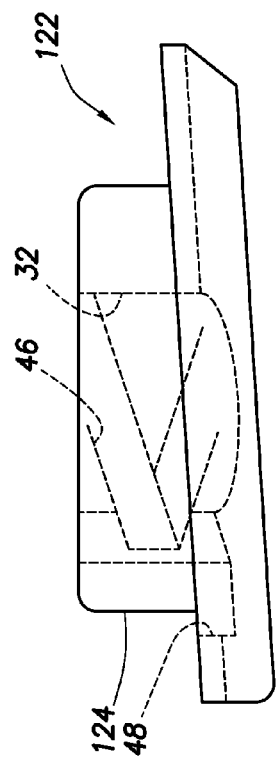

Referring additionally now to FIGS. 32-34, an insert 122 which embodies principles of this disclosure is representatively illustrated. The insert 122 includes a cylindrical projection 124 which is dimensioned so that it fits complementarily into the recess 120 in the adaptor nose 116.

In addition, the insert 122 includes many of the features described above for the adaptor 16. For example, the insert 122 includes the opening 28, the eccentrically offset thread 46, the recess 48 and the interface surfaces 60, 62. These elements can provide some or all of the above-described advantages to the adaptor nose 116 (e.g., enhanced nose/tooth stabilization and improved attachment of a tooth to the nose).

Referring additionally now to FIG. 35, the insert 122 is representatively illustrated as installed in the adaptor nose 116. In addition, the lock device 82 is depicted as being installed in the insert 122. Note, however, that other lock devices (including any of the lock devices described above) may be used in keeping with the principles of this disclosure.

The opening 32 in the insert 122 is preferably concentric with the opening 118 in the adaptor nose 116. However, note that the thread 46 is eccentric relative to each of the openings 32, 118, similar to the manner in which the threads are eccentric relative to the opening 32 in the adaptor nose 22 described above.

Referring additionally now to FIGS. 36 & 37, installation of an excavator tooth 126 on the adaptor nose 116 is representatively illustrated. The tooth 126 has a pocket 128 formed therein which is complementarily shaped relative to the adaptor nose 116 with the insert 122 installed therein.

Thus, the tooth pocket 128 has interface surfaces 130, 132 formed therein which complementarily engage the surfaces 60, 62 on the insert 122. The engagement between these respective surfaces 60 and 130, and 62 and 132, provides enhanced stabilization between the tooth 126 and the adaptor nose 116, e.g., by resisting torque applied in each of opposite directions to the tooth about its longitudinal axis 40.

The tooth 126 also has the opening 28 and the thread-engaging portion 110 formed in one side thereof for receiving the fastener 26. The thread-engaging portion 110 aids in removing the fastener 26 from the adaptor 114 and tooth 126 as described above. Although the thread-engaging portion 110 is depicted in FIGS. 36 & 37 as being formed in only one side of the tooth 126, in other examples the thread-engaging portion could be formed in both sides of the tooth, thereby allowing the tooth to be reversed on the adaptor nose 116.

The fastener 26 can be installed in the tooth 126 and adaptor 114 as described above for the adaptor 16 and tooth 18, after the nose 116 is received in the pocket 128. The lock device 82 will prevent inadvertent dislodgement of the fastener 26 from the tooth 126 and adaptor 114.

It will now be fully appreciated that the attachment system 20, excavator teeth 18, 126, adaptor nose 22 and insert 122 described above provide several advancements to the art of excavator teeth installation, securement and removal. The fastener 26 and lock device 82 releasably secure the teeth 18, 126 on the respective adaptor noses 22, 116 in a manner which is desirably simple, safe, efficient, convenient and reliable.

The above disclosure provides to the art an attachment system 20 for an excavator implement 10. The system 20 can include an excavator tooth 126 having a nose-receiving pocket 128 formed therein, an insert 122 received in a recess 120 formed in an adaptor nose 116, and a threaded fastener 26 which releasably secures the tooth 126 on the nose 116. The fastener 26 can have a helical fastener thread 88 formed thereon which is eccentric relative to a body 86 of the fastener 26.

The insert 122 may have a threaded fastener-receiving opening 32 formed therein, with at least one fastener-receiving thread 46 formed in the insert 122 being eccentric relative to the opening 32.

The fastener thread 88 may extend outwardly from the body 86, with the fastener thread 88 on one lateral side of the body 86 being tangential with an outer surface of the body 86.

The tooth 126 may have fastener-receiving openings 28 formed through opposite lateral side walls 136 of the pocket 128. The fastener body 86 can engage the tooth fastener-receiving openings 28 on opposite sides of the thread 88 when the fastener 26 secures the tooth 126 on the adaptor nose 116.

The insert 122 can have a fastener-receiving opening 32 formed therein, with the insert fastener-receiving opening 32 being eccentric relative to the tooth fastener-receiving openings 28, such that the fastener thread 88 is coaxial with the tooth fastener-receiving opening 28 when the fastener body 86 is coaxial with the insert fastener-receiving opening 32.

At least one of the tooth fastener-receiving openings 28 may include a thread-engaging portion 110 which engages the fastener thread 88 as the fastener 26 is unthreaded from the insert fastener-receiving opening 32.

The system 20 can also include a lock device 82 which engages both the fastener 26 and the insert 122, whereby the lock device 82 prevents rotation of the fastener 26 relative to the insert 122.

The insert 122 may include inclined interface surfaces 60, 62 which complementarily engage interface surfaces 130, 132 formed in the tooth 126, whereby the engagement between the insert interface surfaces 60, 62 and the respective tooth interface surfaces 130, 132 stabilizes the tooth 126 on the adaptor nose 116.

Also described above is an excavator tooth 126 for use on a nose 116 of an excavator adaptor 114. The tooth 126 can include a nose-receiving pocket 128 bounded by opposing side walls 136, with at least one of the side walls 136 having an insert-receiving recess 134 formed therein, and generally planar insert-engaging interface surfaces 130, 132 formed therein, one interface surface 130 resisting rotation of the tooth 126 about a longitudinal axis 40 of the tooth 126 in one direction, and another interface surface 132 resisting rotation of the tooth 126 about the longitudinal axis 40 in an opposite direction.

Each of the interface surfaces 130, 132 may be inclined relative to a lateral axis 42 of the tooth 126 perpendicular to the longitudinal axis 40.

A tooth fastener-receiving opening 28 formed through at least one of the side walls 136 can include a thread-engaging portion 110 which engages a fastener thread 88 as a fastener 26 is unthreaded from an insert fastener-receiving opening 32.

The above disclosure also describes an excavator tooth 126 for use on a nose 116 of an excavator adaptor 114. The tooth 126 can include a nose-receiving pocket 128 bounded by opposing side walls 136, with at least one of the side walls 136 having an insert-receiving recess 134 internally formed thereon, whereby the recess 134 receives an insert 122 installed in the adaptor nose 116.

At least one of the side walls 136 can have a fastener-receiving opening 28 formed therethrough perpendicular to a longitudinal axis 40 of the tooth 126, with the tooth fastener-receiving opening 28 including a thread-engaging portion 110 which engages a fastener thread 88 as a fastener 26 is unthreaded from an insert fastener-receiving opening 32.

The thread-engaging portion 110 can include a threaded portion of the tooth fastener-receiving opening 28. The thread-engaging portion 110 can include a ramped portion of the tooth fastener-receiving opening 28. The thread-engaging portion 110 may be eccentric relative the insert fastener-receiving opening 32.

The insert-receiving recess 134 may have generally planar nose-engaging interface surfaces 130, 132 formed therein, with one interface surface 130 resisting rotation of the tooth 126 about a longitudinal axis 40 of the tooth 126 in one direction, and another interface surface 132 resisting rotation of the tooth 126 about the longitudinal axis 40 in an opposite direction. Each of the interface surfaces 130, 132 may be inclined relative to a lateral axis 42 of the tooth 126 perpendicular to the longitudinal axis 40.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. An excavator tooth for use on a nose of an excavator adaptor, the tooth comprising:
a nose-receiving pocket bounded by opposing side walls;
at least one of the side walls having an insert-receiving recess formed therein, and first and second generally planar insert-engaging interface surfaces formed therein, the first interface surface resisting rotation of the tooth about a longitudinal axis of the tooth in a first direction, and the second interface surface resisting rotation of the tooth about the longitudinal axis in a second direction opposite to the first direction, wherein each of the first and second interface surfaces is inclined relative to a lateral axis of the tooth perpendicular to the longitudinal axis.

2. An excavator tooth for use on a nose of an excavator adaptor, the tooth comprising:
a nose-receiving pocket bounded by opposing side walls;
at least one of the side walls having an insert-receiving recess formed therein, and first and second generally planar insert-engaging interface surfaces formed therein, the first interface surface resisting rotation of the tooth about a longitudinal axis of the tooth in a first direction, and the second interface surface resisting rotation of the tooth about the longitudinal axis in a second direction opposite to the first direction, wherein a tooth fastener-receiving opening formed through at least one of the side walls includes a thread-engaging portion which engages a fastener thread as a fastener is unthreaded from an insert fastener-receiving opening.

3. An excavator tooth for use on a nose of an excavator adaptor, the tooth comprising:
a nose-receiving pocket bounded by opposing side walls; and
at least one of the side walls having an insert-receiving recess internally formed thereon, whereby the recess receives an insert installed in the adaptor nose, wherein at least one of the side walls has a fastener-receiving opening formed therethrough perpendicular to a longitudinal axis of the tooth, and the tooth fastener-receiving opening including a thread-engaging portion which engages a fastener thread as a fastener is unthreaded from an insert fastener-receiving opening.

4. The excavator tooth of claim 3, wherein the thread-engaging portion comprises a threaded portion of the tooth fastener-receiving opening.

5. The excavator tooth of claim 3, wherein the thread-engaging portion comprises a ramped portion of the tooth fastener-receiving opening.

6. The excavator tooth of claim 3, wherein the thread-engaging portion is eccentric relative the insert fastener-receiving opening.

7. An excavator tooth for use on a nose of an excavator adaptor, the tooth comprising:
a nose-receiving pocket bounded by opposing side walls; and
at least one of the side walls having an insert-receiving recess internally formed thereon, whereby the recess receives an insert installed in the adaptor nose, wherein the insert-receiving recess has first and second generally planar nose-engaging interface surfaces formed therein, the first interface surface resisting rotation of the tooth about a longitudinal axis of the tooth in a first direction, and the second interface surface resisting rotation of the tooth about the longitudinal axis in a second direction opposite to the first direction.

8. The excavator tooth of claim 7, wherein each of the first and second interface surfaces is inclined relative to a lateral axis of the tooth perpendicular to the longitudinal axis.

* * * * *